(12) United States Patent
Londo et al.

(10) Patent No.: US 7,606,113 B2
(45) Date of Patent: Oct. 20, 2009

(54) MODELING SOUND PROPAGATION FOR UNDERWATER TEST AREAS

(75) Inventors: Shawn P Londo, Binghamton, NY (US); Matthew A Martz, Blacksburg, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 333 days.

(21) Appl. No.: 11/746,918

(22) Filed: May 10, 2007

(65) Prior Publication Data

US 2009/0067290 A1 Mar. 12, 2009

(51) Int. Cl.
*G01S 15/88* (2006.01)
(52) U.S. Cl. .......................................... 367/89; 367/13
(58) Field of Classification Search .................. 367/13, 367/89, 131
See application file for complete search history.

(56) References Cited

U.S. PATENT DOCUMENTS

| | | | | |
|---|---|---|---|---|
| 3,388,372 | A | * | 6/1968 | De Witz .................... 367/89 |
| 3,441,901 | A | * | 4/1969 | Cawley et al. ............... 367/89 |
| 4,312,053 | A | | 1/1982 | Lipsky |
| 4,805,160 | A | | 2/1989 | Ishii et al. |
| 4,974,213 | A | | 11/1990 | Siwecki |
| 5,079,749 | A | | 1/1992 | Aminzadeh et al. |
| 5,568,450 | A | | 10/1996 | Grande et al. |
| 5,640,368 | A | | 6/1997 | Krebs |
| 5,640,369 | A | | 6/1997 | Capell, Sr. |
| 5,819,676 | A | | 10/1998 | Cwalina |
| 5,824,946 | A | | 10/1998 | Cwalina |
| 6,028,823 | A | | 2/2000 | Vincent et al. |
| 6,088,297 | A | | 7/2000 | Stottlemyer |
| 6,388,948 | B1 | | 5/2002 | Vincent et al. |
| 6,577,557 | B1 | | 6/2003 | Stottlemyer |
| 6,700,832 | B2 | | 3/2004 | Yang |
| 7,002,877 | B2 | | 2/2006 | Arvelo et al. |
| 2005/0058022 | A1 | | 3/2005 | Kitchin et al. |

\* cited by examiner

*Primary Examiner*—Ian J Lobo
(74) *Attorney, Agent, or Firm*—Burr & Brown

(57) ABSTRACT

A system and method for quickly modeling the ideal acoustic sound propagation in a body of water based on current SVP data and the position of the sound source, comprising the steps of: obtaining SVP data for the body of water; determining a depth of a sound source within the body of water; selecting a first ray angle originating from the sound source; calculating a first ray trace for the first ray angle using only the SVP data as environmental inputs; repeating the selecting and calculating steps for second-$n^{th}$ ray angles to calculate second-$n^{th}$ ray traces for the second-$n^{th}$ ray angles; and plotting the first-$n^{th}$ ray traces to create a ray trace plot for the body of water relative to the depth of the sound source.

14 Claims, 9 Drawing Sheets

RAY TRACE PLOT FOR SOUND RAYS
INTERSECTING TARGET LOCATION

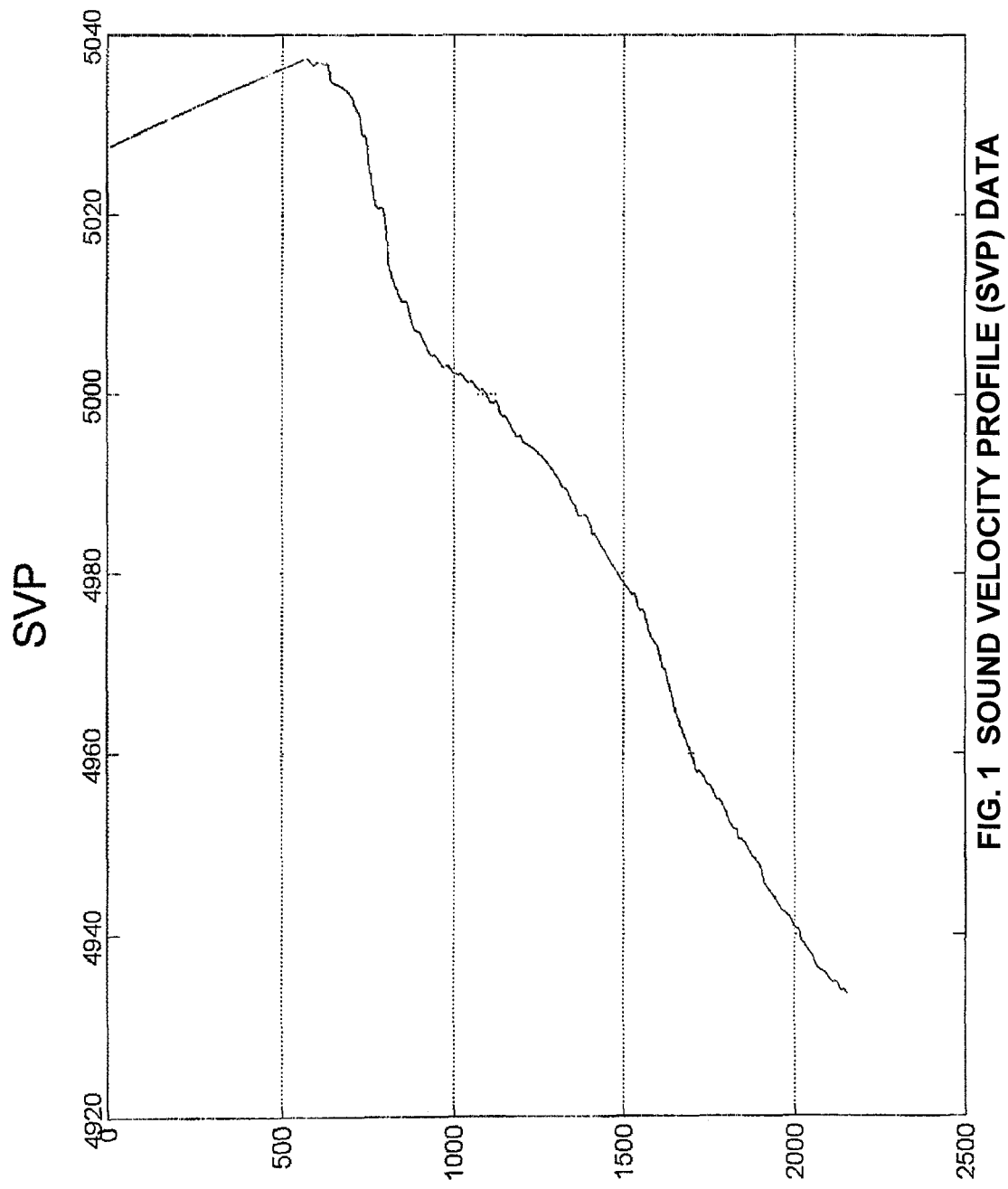
FIG. 1 SOUND VELOCITY PROFILE (SVP) DATA

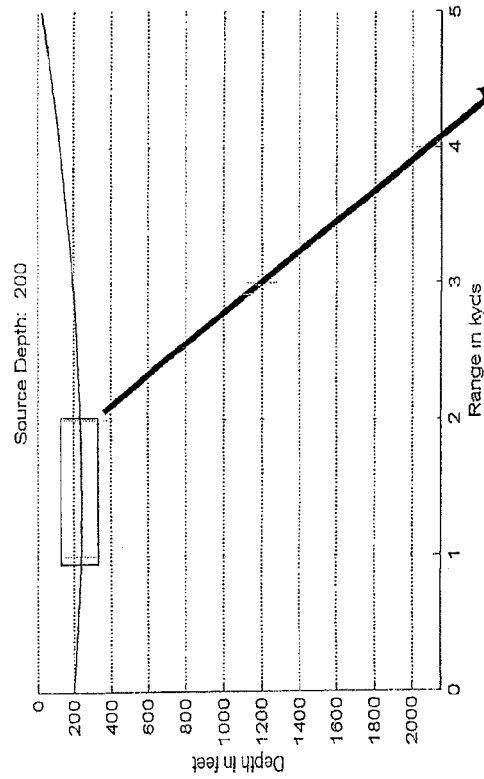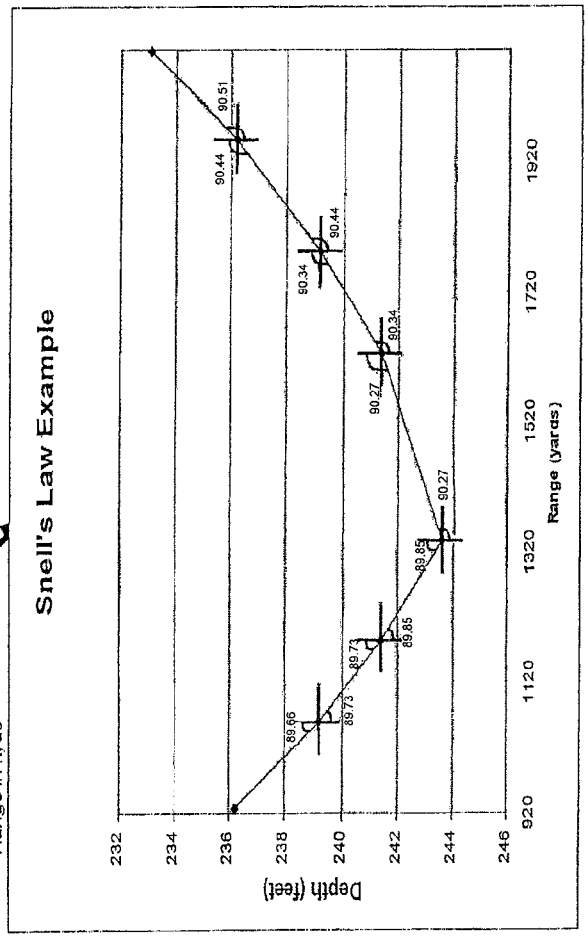
FIG. 2 SNELL'S LAW RAY TRACE PLOT EXAMPLE

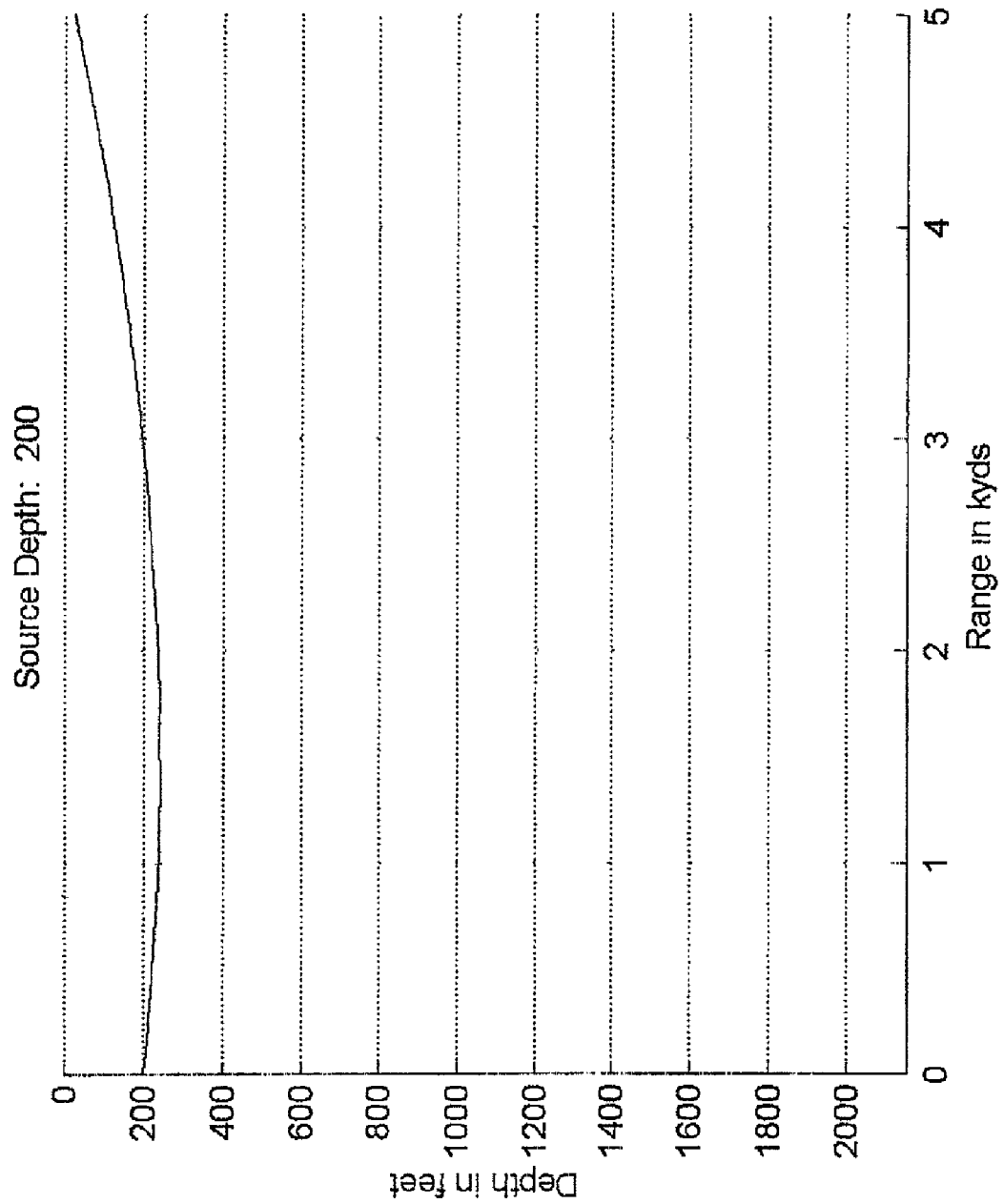
FIG. 3 RAY TRACE PLOT EXAMPLE

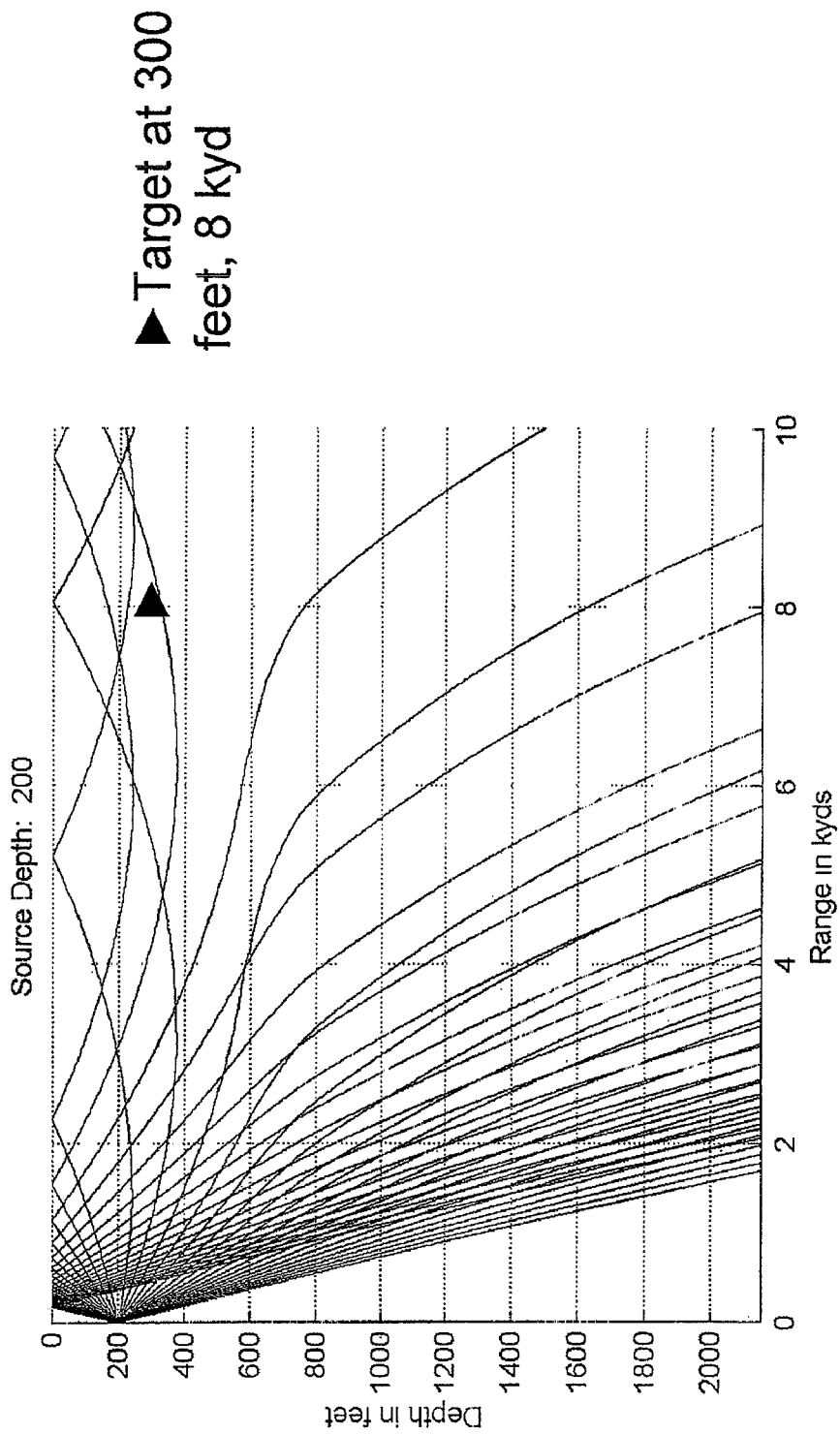
FIG. 4 RAY TRACE PLOT FOR SOUND RAYS INTERSECTING TARGET LOCATION

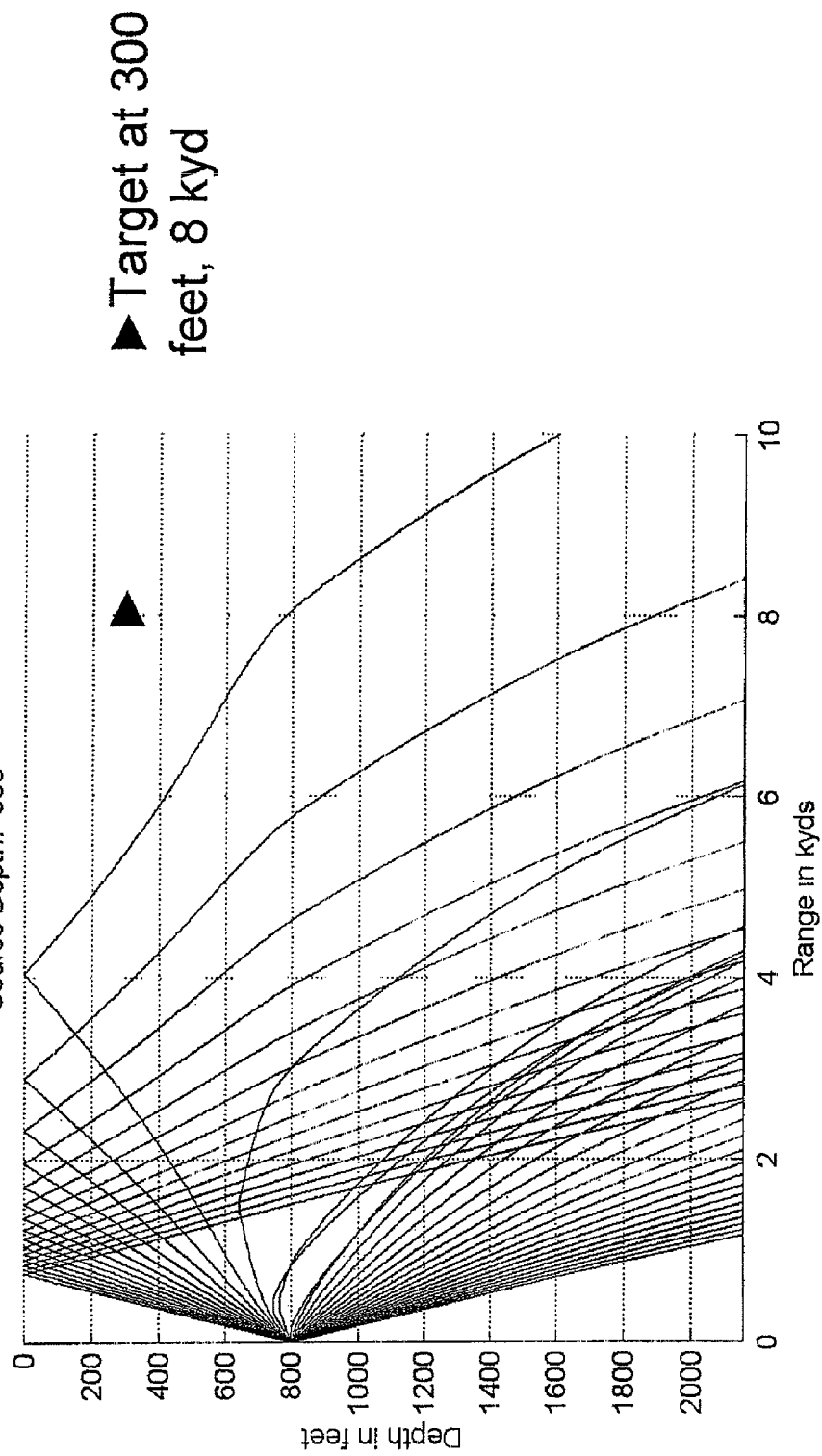
FIG. 5 RAY TRACE PLOT FOR SOUND RAYS NOT INTERSECTING TARGET LOCATION

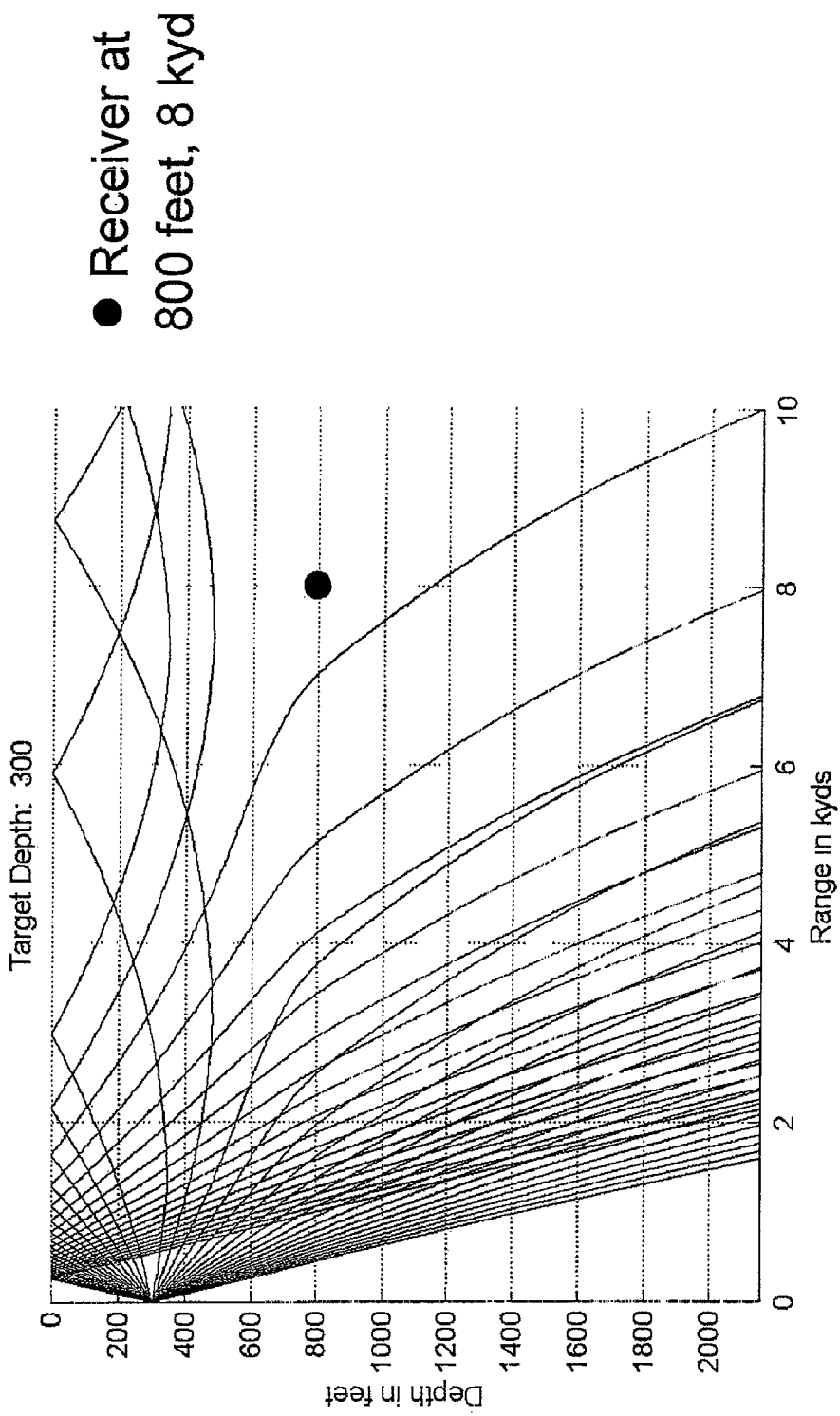
FIG. 6 RAY TRACE PLOT FOR SOUND RAYS NOT INTERSECTING RECEIVER LOCATION

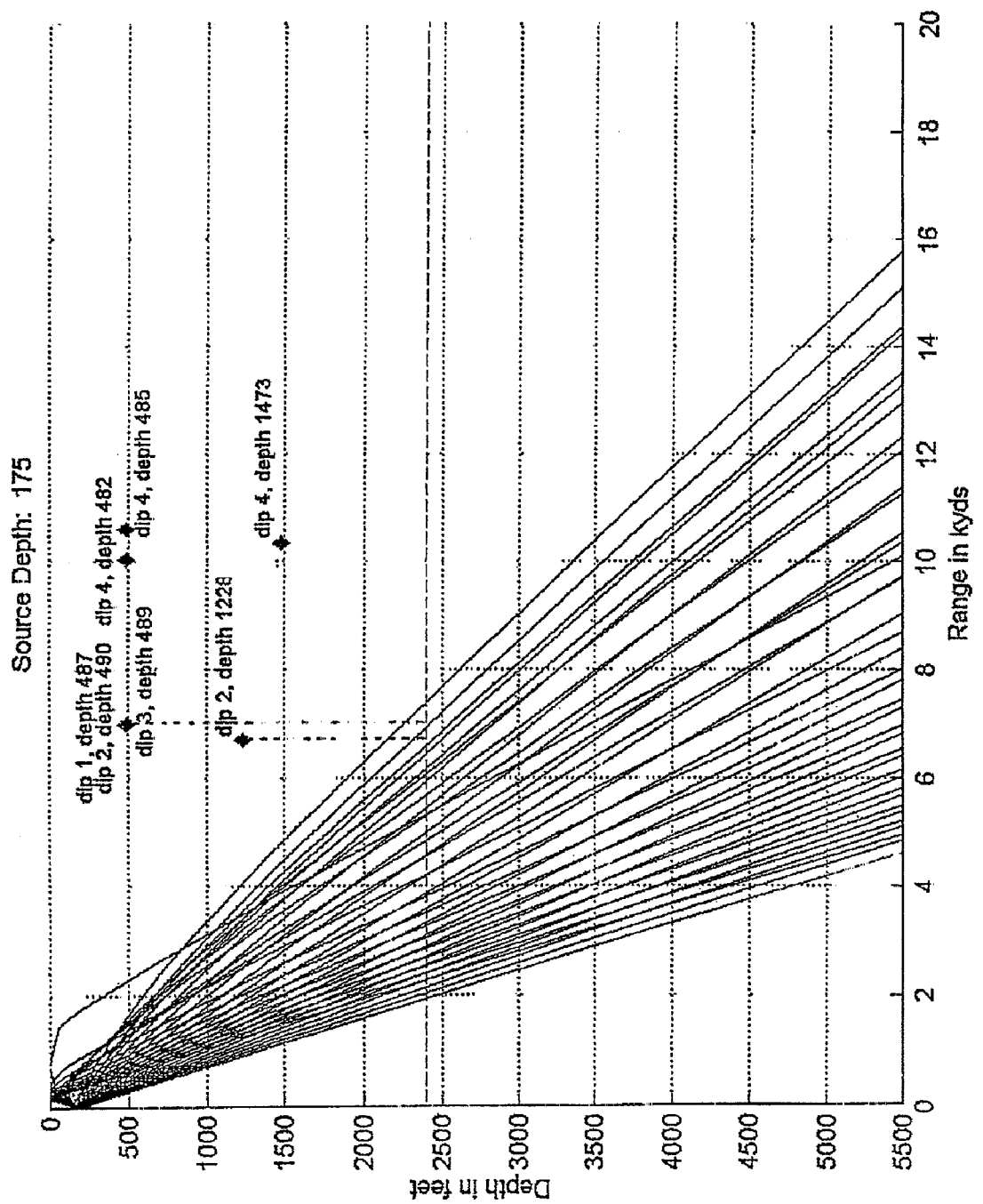
FIG. 7 METHOD FOR MODELING UNDERWATER SOUND PROPAGATION

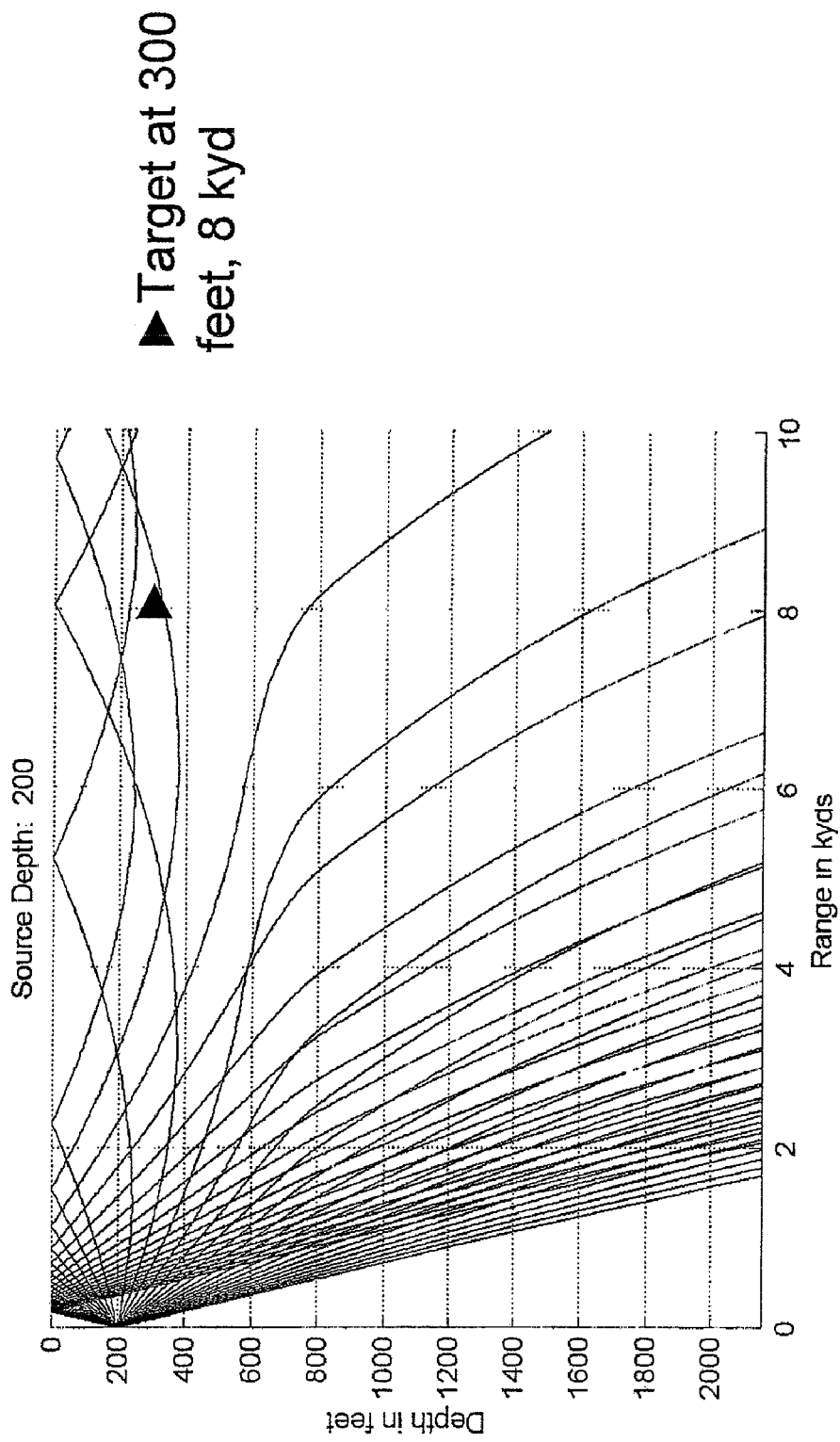
FIG. 8 RAY TRACE PLOT FOR SOUND RAYS INTERSECTING TARGET LOCATION

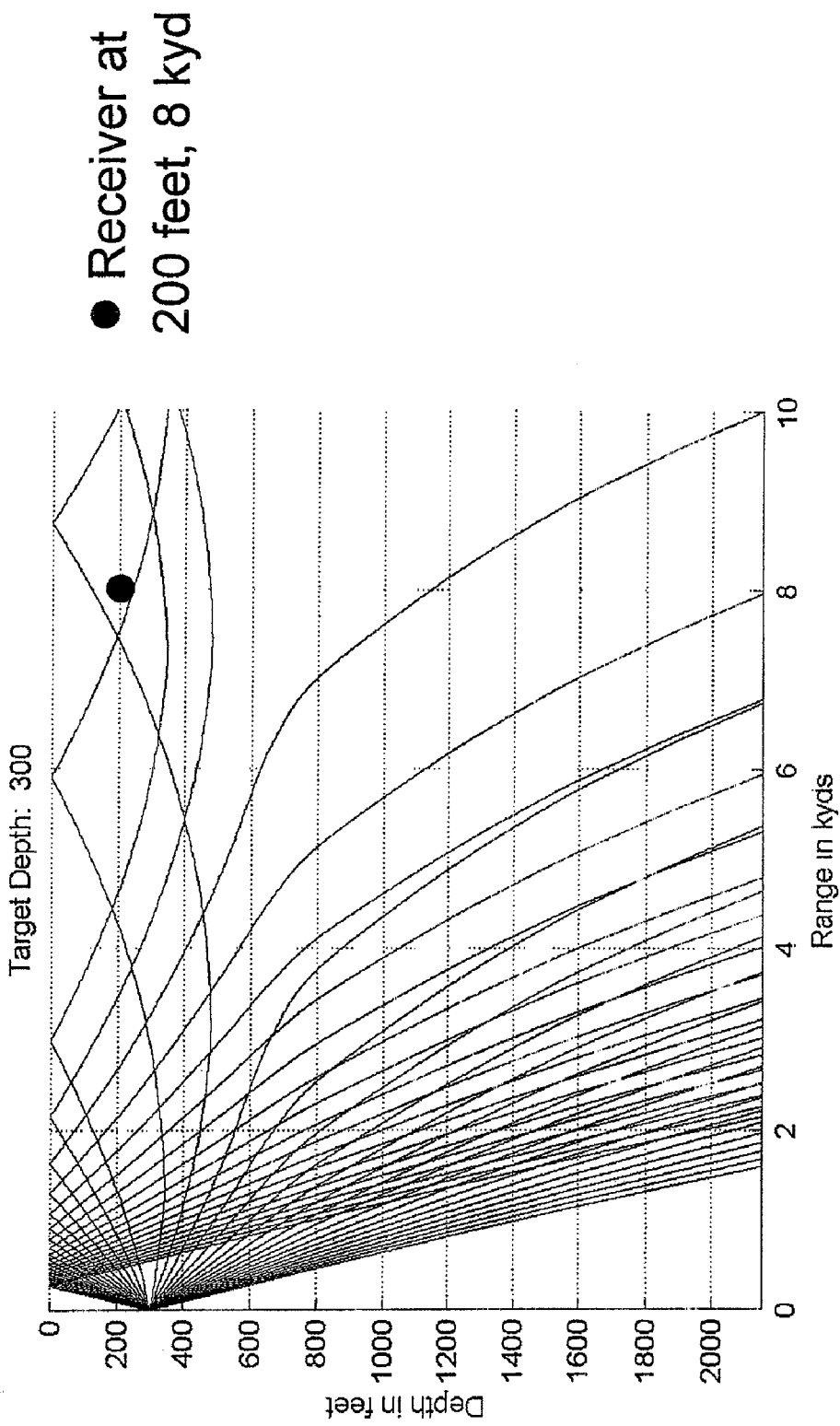
FIG. 9 RAY TRACE PLOT FOR SOUND RAYS REFLECTING OFF WATER SURFACE THAT INTERSECT THE RECEIVER LOCATION

MODELING SOUND PROPAGATION FOR UNDERWATER TEST AREAS

STATEMENT OF GOVERNMENT INTEREST

The Government of the United States of America has rights in this invention pursuant to Contract No. N00019-93-C-0196, awarded by the United States Navy (USN).

FIELD OF THE INVENTION

This invention relates generally to modeling sound propagation in a body of water, and specifically to modeling sound propagation in an underwater acoustic test environment using only sound velocity profile data and depth as input data.

BACKGROUND OF THE INVENTION

Sound transmitting and receiving equipment, such as sonar, is used in an underwater environment to detect sound reflective objects that are on the surface or below the surface of the water. Sonar systems can be broadly divided into two types: active sonar and passive sonar. An underwater sound source, such as active sonar, includes a transmitter that emits a sound wave that can be reflected off of a sound reflective object and a receiver that detects and measures the time of reception of the reflected sound wave. The distance to a sound reflective object can be determined by measuring the time difference from the transmission of the sound wave to reception of reflected sound wave. A sonar receiver is typically co-located with the active sonar transmitter, but a receiver may also be at a different physical location. A passive sonar system includes an underwater sound receiver that operates covertly but can only detect objects emitting sounds louder than the ambient noise of the environment. For a sonar receiver to detect sounds propagating from a target, the strength of the sound must be larger the variables represented in the sonar equation. The sonar equation for a passive sonar detection of a sound source can be expressed as:

$$SE=SL-TL+DI-AN-DT$$

Where:
SE=Signal Excess. (This value must be positive for detection to occur)
SL=Source Level
TL=Transmission Loss
DI=Directivity Index
AN=Ambient Noise (background)
DT=Detection Threshold All of the sonar equation inputs are expressed in decibels (dB).

Similarly, the sonar equation for an active sonar detection of a sound reflective object can be expressed as:

$$SE=SL-2TL+TS+DI-AN-DT$$

Where:
SE=Signal Excess. (This value must be positive for detection to occur)
TS=Target Strength (The strength of the sound signal returning to the sonar receiver, target strength is aspect dependent and is typically defined as $$\frac{\text{reflected energy}}{\text{incident energy}}).$$

SL=Source Level. (The strength of the signal transmitted by an active sonar).
2TL=Transmission Loss (This accounts for losses in both directions).
DI=Directivity Index
AN=Ambient Noise (background)
DT=Detection Threshold In some applications, the active sonar equation may also include reverberation (RL), which is subtracted from the source level.

To ascertain the performance of underwater sound transmitting and receiving equipment, the equipment is usually tested in a controlled environment, such as an underwater test range. In an ideal isotropic environment, a sound wave will propagate spherically outward in a straight line from a point source. However, the ocean environment is not isotropic, so sound waves emitted from a sound source do not propagate through the water in a linear fashion due to differences in temperature and pressure in the underwater environment. The temperature of the water comprising a body of water, such as an underwater test range, varies with depth and frequently between depths of 30 and 100 meters there are often marked changes, called layers, which divide the warmer surface water from the remaining colder, deeper waters. Under these temperature and pressure conditions, a sound wave bends, or refracts, off each layer as the sound wave passes through the water along its propagation path. The refraction or bending of the sound waves may cause detection "blind spots" where detection of a sound reflective object is precluded because the sound waves emitted from the sound source are unable to reach a specific area or sound waves reflecting off of a sound reflective object are unable to return to the sound source receiver location.

Further, the surrounding acoustic environment also affects sound propagation and the detectability of sound traveling through the water. Some of the acoustic environment variables that affect the propagation and detectability of sound in water include the agitation of the sea surface, ambient noise, transmission losses, reverberation, scattering, and attenuation, for example. The surrounding acoustic environment variables typically attenuate the power of a sound wave originating from the sound source and mask any active sonar returning sound waves, making detection of the sound reflective object difficult. Before a sound source, such as sonar, can be tested objectively, the acoustic conditions likely to be encountered must be measured and its potential impact on the scheduled test events must be understood.

The variability of the acoustic environment in a controlled environment, such as an underwater test range, results in uncertainties in the expected acoustic sound propagation paths, which may adversely impact the validity of test events designed to objectively test the ability of an underwater sound transmitting and receiving system under test to detect a sound reflective target object.

To understand the impact of the acoustic conditions on sound transmitting and receiving equipment performance, complex mathematical equations, or algorithms, were developed to model acoustic conditions and many of the environmental variables. The Hamilton model, Wenz model, Helmholtz wave equations and sonar equations are mathematical equations that classically describe the ocean environment, ocean bottom characterization, and ocean ambient noise. Existing models, including Ray Models, Parabolic Equation Models, Normal Mode Models and Coupled Mode Models, assume similar boundary conditions and acoustic frequencies, and their solutions are typically approximations of the Helmholtz equation. For example, U.S. Pat. No. 7,002,877 discloses a method for predicting sonar performance in littoral waters by modeling acoustic reverberation. Each of these models is subject to and limited by computational errors associated with the complex mathematical algorithms used and the speed of response is limited by the processing capabilities of the computer used for computational processing.

Very complex programs also exist for making predictions for active and passive sonar performance based on the acoustic environment, such as mission planning tools. These complex models require the input of acoustic environmental data including depth, sound speed, propagation and absorption losses and ambient noise, as well as target strength, directivity index, and system equipment detection characteristics. These models are expensive to construct, maintain and typically use only historical sound velocity profile (SVP) data, which includes depth and sound speed data, for an area, which may not be representative of the conditions encountered during testing. For example, PC-IMAT 5.0, which uses the MPP ray trace model, requires the input of several acoustic environment variables before a sound ray trace can be output for a specified angle at a specific depth. PC-IMAT 5.0, which is used by the U.S. Navy for sonar performance mission planning, models the entire acoustic environment and provides specific ranges, depth, and even emission wave form recommendations, includes embedded historical SVP data that is used to generate these specific recommendations for a particular area. The SVP data for a particular area, such as a test range, may vary significantly during the course of a day or test event. Further, due to the large number of input variables and program complexity of these modeling programs, the computational processing required is extensive and the response time is slow.

Modeling programs that account for all of the acoustic environment variables that affect the propagation of sound in water may be necessary for real-world submarine detection and tracking operations, but these modeling programs are overly complex, requiring the input of too many data variables and have too slow a response time to support a test team in the development, test, and evaluation of the detection potential of underwater sound transmitting and receiving equipment, such as sonar systems. More specifically, there is no existing model that quickly models sound propagation in a current acoustic environment enabling a test team to assess the impact of the current acoustic conditions on scheduled test events.

What is needed is a quick and simple system and method for a test team to be able to model sound propagation paths for a sound source in the current acoustic environment of a test area. More specifically, what is needed is a modeling capability for an underwater test environment that will output a graphic representation, or plot, of the existing sound propagation paths for a sound source quickly using a minimum number of acoustic environment input variables to enable a test team to understand the impact of the current acoustic conditions on scheduled test events.

SUMMARY OF THE INVENTION

The system and method of the present invention model the existing sound propagation paths in a body of water, such as an underwater test range, based only on sound velocity profile (SVP) data and an initial transmission/reception depth and angle. A first embodiment of the system and method of the present invention use the steps of:

obtaining the SVP data for the body of water;

determining a depth of a sound source within the body of water;

selecting a first ray angle originating from the sound source;

calculating a first ray trace for the first ray angle using only the SVP data as environmental inputs;

repeating the selecting and calculating steps for second-$n^{th}$ ray angles to calculate second-$n^{th}$ ray traces for the second-$n^{th}$ ray angles; and plotting the first-$n^{th}$ ray traces to create a ray trace plot for the body of water relative to the depth of the sound source.

The output of the present invention is a ray trace plot that provides a "snapshot" of the existing sound propagation paths for a specified depth. This enables a test team to assess the potential impact the modeled acoustic environment will have on the scheduled test events, (i.e., the detection performance of the underwater sound transmitting and receiving equipment being tested), prior to conducting a test.

The system and method of the present invention can quickly determine the existing sound propagation paths for sound waves emitted by a sound source, such as active sonar at a known location and depth within a test area. One or more desired ray angles are selected from a predetermined range of ray angles to use the system and method of the present invention. In one embodiment, the first-$n^{th}$ ray angles are selected from a predetermined range of ray angles that are at equally spaced intervals within the range.

In another embodiment of the present invention, the calculating step of the method of the present invention further includes the steps of:

selecting depth/sound speed pairs from the SVP data; and calculating horizontal range from the sound source for each depth/sound speed pair.

Another embodiment of the method of the present invention includes the steps of: determining additional depths of the sound source within the body of water; and repeating the selecting and calculating steps to create a ray trace plot for the body of water relative to each additional depth of the sound source. The method of the present invention can provide ray trace data for sound waves emitted by a sound source under the current acoustic conditions on the range at specified depths of interest prior to conducting a test. Operationally, this enables a test director to modify or cancel test events where the acoustic conditions will adversely affect the validity of a test event and/or the detection performance of a system under test, prior to conducting the test.

Another aspect of the present invention is that the system and method can also be used where a sound source reflects sound waves generated by another source. For example, sound waves from an active sonar transmission by another source reflect off of the surface of a sound reflective target object and are detected by the system under test. In this case, the system and method of the present invention can determine whether a sound propagation path exists for reflected sound waves to return to a sound source or to be detected by a receiver in a different location.

Where the location of the sound source is unknown, a user can input a plurality of different depths for a sound source in the determining step, and the selecting and calculating steps are repeated to create a plurality of ray trace plots for the body of water relative to the plurality of assumed depths. By calculating ray trace data for different depths within the test range, the system and method of the present invention also enable a test team to determine the depths at which the sound reflective target object will minimize its acoustic signature.

Further, the present invention enables a test team to independently confirm the operability of an underwater sound receiver, such as a sonar receiver, in an underwater testing environment. In this embodiment, the system and method of the present invention use the steps of:

obtaining SVP data for the underwater testing environment;

determining a depth of a sound source within the underwater testing environment;

selecting a first ray angle originating from the sound source; calculating a first ray trace for the first ray angle using only the SVP data as environmental inputs;

repeating the selecting and calculating steps for second-$n^{th}$ ray angles to calculate second-$n^{th}$ ray traces for the second-$n^{th}$ ray angles;

plotting the first-$n^{th}$ ray traces to create a ray trace plot for the underwater testing environment relative to the depth of the sound source; and deploying underwater sound transmitting and receiving equipment, such as a sonar receiver, at a location (depth and range from the sound source) in the underwater testing environment that intersects at least one ray trace on the ray trace plot for the sound source; and confirming that the sonar receiver detects the sound source.

A system for confirming the operability of an underwater sound receiver in an underwater testing environment, the system comprising:

means for obtaining SVP data for the underwater testing environment;

means for determining a depth of a sound source within the underwater testing environment;

means for selecting a first-$n^{th}$ ray angles originating from the sound source;

means for calculating a first-$n^{th}$ ray traces for the first-$n^{th}$ ray angles using only the SVP data as environmental inputs;

means for plotting the first-$n^{th}$ ray traces to create a ray trace plot for the underwater testing environment relative to the depth of the sound source; and means for deploying underwater sound transmitting and receiving equipment, such as a sonar receiver, at a location (depth and range from the sound source) in the underwater testing environment that intersects a ray trace on the ray trace plot for the sound source; and confirming that the sonar receiver detects the sound source.

The means for obtaining SVP data include SVP data derived from the temperature versus depth data from expendable bathythermographs (XBTs), data received from sensors collocated with the sound source/sound receiver, SVP data received via a radio link or manually entered SVP data, for example. The means for determining the depth of the sound source include data received directly from the sound source/sound receiver, another sonar or test range monitoring system. The means for selecting a first-$n^{th}$ ray angles originating from the sound source, means for calculating a first-$n^{th}$ ray traces and means for plotting the first-$n^{th}$ ray traces to create a ray trace plot include one or more general purpose computers running appropriate software programs and a printer capable of reproducing plot graphics. The means for deploying the sonar receiver may be a helicopter, such as the U.S. Navy Multi-Mission (MMH) helicopter, a fixed wing aircraft, a ship, or a submarine.

The present invention also includes a computer-readable medium having stored thereon computer executable instructions for implementing a method of modeling sound propagation in a body of water according to the steps described above in connection with the first embodiment.

Another embodiment of the present invention also includes a computer-readable medium having stored thereon computer executable instructions for confirming operability of an underwater sound receiver in an underwater testing environment according to the steps described above in connection with the second embodiment.

The ray trace output of the present invention provides a visual representation of the sound propagation paths for a given sound source depth versus range under the current acoustic conditions. Where the system and method of the present invention are used to plot the sound propagation paths for several sound source depths, the ray trace output of the present invention provides a graphic representation of where sound travels, enabling a test team to determine where a sound source should be employed to have an opportunity to detect a sound reflective target object under the current acoustic conditions. The test team can use this ray trace plot information to conduct a test program more effectively, and can make more informed decisions on whether a lack of detection is related to the acoustic conditions or system under test equipment problems.

The present invention also enables a test team to independently validate sonar location and depth recommendations being generated by computer programs resident in an underwater transmitting and receiving system under test. For example, the present invention can be used to validate location, depth and sound wave pulse length recommendations from mission-planning tools associated with the underwater transmitting and receiving system being tested.

In addition, a test team can also use the present invention as a post-test evaluation tool for assessing the impact the existing acoustic environment had on the outcome of specific test events.

BRIEF DESCRIPTION OF THE DRAWINGS

To assist understanding the present invention, reference should be made to the following detailed description, read in connection with the accompanying drawings, in which:

FIG. 1 is an example of a plot of Sound Velocity Profile (SVP) data;

FIG. 2 is an example of a Snell's Law ray trace plot for a sound wave propagating from a sound source at a depth of 200 feet with an initial depression angle of 1° below the horizontal plane;

FIG. 3 is an example of a ray trace plot for sound rays propagating from a sound source having an initial depression angle of 1° below the horizontal at a depth of 200 feet;

FIG. 4 is an example of a ray trace plot for sound rays propagating from a sound source having an initial depression angle of −20°-to-+20° with respect to the horizontal plane at a depth of 200 feet that intersect the location of a target;

FIG. 5 is an example of a ray trace for sound rays propagating from a sound source having an initial depression angle of −20°-to-+20° with respect to the horizontal plane at a depth of 800 feet that do not intersect the location of a target;

FIG. 6 is an example of a ray trace plot for sound rays propagating from a target that do not intersect the location of a sound receiver;

FIG. 7 is an example of a ray trace plot for sound rays propagating from a sound source at a depth of 175 feet and sound receiver deployment locations that have a low probability of detecting the target;

FIG. 8 is an example of a ray trace plot for sound rays propagating from a sound source that intersect the location of a target at a range of 8000 yards and a depth of 300 feet; and FIG. 9 is an example of a ray trace plot for sound rays reflecting off a target and the water surface that intersect the location of a sound receiver at a range of 8000 yards and a depth of 300 feet.

DETAILED DESCRIPTION OF THE INVENTION

The system and method of the present invention quickly determine the ideal acoustic sound wave propagation paths available in the underwater test area by applying Snell's law to a current acoustic environment model based only on the current SVP data input and position of the sound source.

The system and method of the present invention uses the concept of sound rays to characterize the refraction of the sound waves in a body of water, such as the waters of a test area based on sound speed data. A sound ray is a vector that is perpendicular to the wave front and points in the direction in which the sound propagates. A ray trace is a line that traces a collection of sound rays over a propagation path. Ray traces represent the most probable paths sound waves emitted from a sound source at a specified depth will follow based on the current acoustic conditions. This ray method closely approximates actual propagation paths for wavelengths much less than the height of the water column. For example, where the height of the water column is 1000 feet (i.e., 1000 foot water depth), the ray method is most applicable to frequencies greater than 50 Hz (i.e., wavelengths of less than 100 feet).

In all bodies of water, sound velocity is affected by the density or mass per unit volume of the water. The density of the water is affected by temperature, salinity, and pressure of the water. The extent of the sound energy's refraction is influenced by sound speed, which varies with temperature, depth, and salinity. Sound speed, which is also referred to as Sound Velocity Profile (SVP) data, is a measure of sound speed versus depth in a body of water. As depth increases the pressure exerted by the water column increases, which increases the density of the water, and this results in an increase in the velocity of sound propagating through the water. As shown in FIG. 1, the sound velocity in the water increases in almost a linear manner between the surface and a depth of 500 feet due to sound speed increasing with depth. The SVP data typically consists of a sound speed value at a depth, which is referred to as a sound speed pair. This increase in sound velocity causes propagating sound waves to refract away from the area of higher sound velocity. As a sound wave propagates through the water, the angle of the sound wave will change due to this refraction. In one embodiment of the present invention, a new angle for a sound wave is plotted for each sound speed pair from the SVP data.

SVP data is either received directly from an external source, such as an expendable bathythermograph (XBT), or is manually input by a user. SVP data may be provided in different formats, including hardcopy plots and software files. In one embodiment, the SVP data is formatted as a text file. In a preferred embodiment, the SVP data is provided in a tab-delimited text file format. SVP data can also be data points calculated from an existing SVP data plot. SVP data in other data formats can be converted to a text file format to be used with the present invention.

The system and method of the present invention can use either historical SVP data for the specified body of water or, more preferably, current SVP data that is collected within hours of the planned test. Using current SVP data provides a more accurate model of the existing sound propagation paths in the specified body of water. In one embodiment, the SVP data for the body of water is measured within 24 hours of initiating the method of the present invention. Since test range acoustic conditions will change over time, the SVP data for the body of water is updated during the test.

The mathematical model of refraction that is used to calculate the refraction of sound when traveling between two media of differing refractive indexes is known as Snell's Law. Snell's Law is expressed by the following equation:

$$\frac{\sin\Theta_1}{V_1} = \frac{\sin\Theta_2}{V_2}$$

Where:

$\Theta_1$ is the incident angle of a sound ray.

$V_1$ is the sound velocity for the initial emission depth.

$\Theta_2$ is the new angle of refraction.

$V_2$ is the sound velocity for the next depth.

This equation can also be expressed as $$\Theta_1 = \text{Arcsin}\left(\frac{V_1}{V_2}\sin\Theta_2\right) \text{ or } \Theta_2 = \text{Arcsin}\left(\frac{V_2}{V_1}\sin\Theta_1\right)$$

FIG. 2 shows an example of a Snell's Law ray trace plot for a sound wave generated by a sound source at a depth of 200 feet at an initial angle of 1 degree below the horizontal plane. The angle is referenced to the normal perpendicular to the horizontal plane established by the sound speed boundary between different sound speed layers of water. In FIG. 2, the angle $\Theta_1$ is labeled for each ray and sound speed boundary intersection from 927 yards to 2087 yards. The initial sound emission depth and initial angle to be plotted are known values. The ray trace system and method of the present invention calculates the horizontal displacement and angular change due to refraction for a sound ray starting at a first known depth, typically the location of the sound source through each intervening depth from the SVP data to the location of a sound reflective object or sound receiver located at a second depth. The next depth, or y value, below the initial emission depth is known from the SVP data, and the change in horizontal position distance, or x value, can be calculated to determine the next ray trace point coordinates.

Inserting the initial emission angle for $\Theta_1$, and the sound velocity for the initial emission depth, $V_1$, and the next depth, $V_2$, from the sound velocity profile data, the next ray angle $\Theta_2$ can be calculated. Using this new angle $\Theta_2$ and the sound velocity for $V_2$ and the next SVP data depth, $V_3$, the next ray angle $\Theta_3$ can be calculated, and this process repeats until the ray leaves the boundaries of the test area. The sound wave is assumed to propagate in a straight line until it reaches the next depth value from the sound velocity profile data. The ray traces of the present invention are calculated and plotted for lossless conditions, meaning that the plotted ray traces are not range limited by the sound source level or transmission losses due to attenuation and absorption, for example.

The ray trace data for the sound wave depicted in FIG. 2 is presented in Table 1. The steps delineated above are repeated for each selected angle to provide an omni-directional ray trace for a sound wave emitted by a sound source, such as sonar. While a single ray trace is depicted in FIG. 2, a ray trace may consist of any number of rays.

TABLE 1

Data Table for Snell's Law Example

| Range (yards) | Depth (feet) | Angle (deg) | Speed of Sound (fps) |
|---|---|---|---|
| 927.37 | 236.2 | 89.56 | 5031.65 |
| 1058.47 | 239.2 | 89.66 | 5031.71 |
| 1183.63 | 241.4 | 89.73 | 5031.74 |
| 1338.56 | 243.6 | 89.85 | 5031.78 |
| 1626.08 | 241.4 | 90.27 | 5031.74 |
| 1781.01 | 239.2 | 90.34 | 5031.71 |
| 1951.68 | 236.2 | 90.44 | 5031.65 |
| 2087.16 | 233.1 | 90.51 | 5031.6 |

Whether a propagating sound wave is traveling from lower velocity water to higher velocity water or from higher velocity water to lower velocity water, the angle of the propagating sound wave changes as the sound wave passes through each layer, represented by each sound speed pair in the SVP data. As the depth increases in the initial four depth values shown in Table 1, the associated sound speed also increases. Where a sound wave refracts and bends upwards off of the next layer (i.e., away from the higher velocity water), the depth and sound speed decrease, as shown in the last three depth values shown in Table 1.

When updated SVP data is received, the system and method of the present invention can quickly provide a test team with ray trace data for the updated acoustic conditions. This enables a test team to determine whether changes in the acoustic conditions will adversely impact the scheduled test events.

The depth of a sound reflective object or sound receiver may be greater or less than the depth of the sound source. The system and method of the present invention only requires the depth of the sound source and SVP data to determine whether sound ray paths are present between the sound source and possible target object locations for one or more sound wave emission angles.

The system and method of the present invention generate ray traces, which depict the sound propagation paths that exist for sounds emitted at the specified emission depth and angle based on the SVP data of the acoustic environment. The ray trace output of the present invention represents the existing sound propagation paths that exist in an underwater test area based on the current acoustic conditions. The sound propagation paths represented by the ray trace output are applicable to both active and passive underwater sound transmitting and receiving equipment. Optional data that may be entered into the present invention includes the depth and range of an underwater sound receiver, where the underwater sound receiver is not co-located with the underwater sound transmitter. The ray trace output of the system and method of the present invention depicts whether one or more sound paths exist between the sound source location and depth and the location and depth of a sound reflective target object or sound receiver.

A key consideration for conducting underwater testing is potential blind spots caused by the refraction of the sound waves as the sound waves propagate through the different water layers. A blind spot is an area where there is a low probability of detecting a sound reflective object because of the lack of sound waves propagating through that area. For example, as shown in FIG. 4, a sound source at a depth of 200 feet will have blind spots including one extending from directly below the sound source and including a depth of 1400 feet at a range of approximately 1000 yards, and another at a range of 6000 to 8000 yards at a depth between 400-500 feet. Here, the ray trace plot of the present invention provides a visual "picture" that highlights potential "blind spots" that may be present on the test range based on the current acoustic conditions.

Operationally, a test team may specify a number of angles and sound source depths for the present invention to compute the sound ray traces. For example, ray traces may be provided for angles from 1 to 20 degrees, or from 5 to 45 degrees. FIG. 4 shows a ray trace for −20 degrees-to-+20 degrees angle of depression. The number of rays and the angular difference between adjacent rays is selectable by an operator.

In a preferred embodiment, the system and method of the present invention calculates the location (x, y coordinates) and refraction angle for each depth-sound speed pair from the sound velocity profile. The ray paths represent the most probable path a sound wave emitted from a sound source at a specified depth will follow based on the current acoustic conditions enabling a test team to quickly determine whether a sound wave will propagate to a particular location and depth, assuming the sound waves contain sufficient power. The more complex programs discussed in the background section, provide tactical data, such as sonar dipping locations (points) and dipping depths but take several minutes to compute sound propagation data for a given sound source depth. In contrast, the system and method of the present invention computes the sound ray trace data for multiple sound source depths and emission angles in less than 10 seconds on a typical personal computer with a processor running at 1 GHz or greater, providing a test team with a tool to quickly assess the impact of the current acoustic conditions on scheduled test events, such as detecting and locating a sound source, such as a sound reflective target object.

The ray trace plot data of the present invention enables a test team to understand the impact of the current acoustic conditions and any changes to the current acoustic conditions on the test events scheduled to be conducted. For example, where the position, including depth, of a sound reflective target object is known, a test team can quickly plot the existing sound wave ray traces to visually determine the depths and ranges where a sound receiver will have an opportunity to detect sound waves emitted or reflected by the sound reflective target object. FIG. 4 shows an example of a ray trace plot for an active sound source at a depth of 200 feet. Ray trace plots enable a test team to visualize the existing sound paths under the current acoustic conditions to assess whether the propagating sound will impinge upon and provide an opportunity to detect the sound reflective target object. As shown in FIG. 4, sound waves propagating from a sound source at a depth of 200 feet should impinge upon a target at a range of 8000 yards and a depth of 300 feet. The ray trace data of the present invention may also be used by the test team as an early indicator of a technical problem with the underwater sound source equipment under test where an underwater sound source is unable to detect a sound reflective target object at a depth and location where the ray trace data indicates ray paths exist for detection of a sound reflective target object.

The ray trace data of the present invention can also be used to confirm that no ray path exists between the position of the underwater sound source under test and the sound reflective target object position. For example, sound waves propagating from a sound source at a depth of 800 feet will not impinge upon a target at a range of 8000 yards and a depth of 300 feet, as shown in FIG. 5. This is also valid for sound waves propagating from a target at a depth of 300 feet, which probably will not be detected by a sound receiver at a range of 8000 yards from the target at a depth of 800 feet, as shown in FIG. 6. In both cases, the propagating sound waves will not provide the sound source or sound receiver with an opportunity for detection. This enables a test team to determine that a system under test was not positioned properly to detect a sound reflective target object and not a question of equipment operability.

In addition, the graphic ray trace plot output by the system and method of the present invention can also be used by a test team to determine where a sound source and receiver should be positioned to detect a sound reflective object of known location under the current acoustic conditions on the test range. For example, FIG. 7 shows the ray traces for sound emitted by or reflected by a sound reflective target object at a depth of 175 feet and multiple sound source/receiver location and depth combinations that were used to attempt to detect the object. As shown in FIG. 7, the sound source/receiver location and depth combinations used provided a very low probability for detecting the sound reflective target object at a depth of 175 feet. In this case, the ray trace plot of the present invention would enable a test team to recommend sound source locations and depths that would increase the probability of detection of the sound reflective target object, thereby, enhancing the validity of testing under the specific acoustic conditions encountered. For example, as shown in FIG. 7, a location/depth combination of 4000 yards in range at a depth of 2000 feet would provide a higher probability of detection. This enables a test team to conduct a more efficient and cost effective test program.

Further, the ray traces calculated by the system and method of the present invention for different depths within the test range can also be used by a test team to determine the depths at which a sound reflective target object will minimize its acoustic signature, thereby lessening its probability of being detected.

While the present invention has been described with respect to sound waves propagating from a sound source, such as active sonar, these same principles apply for modeling sound waves projecting from a sound reflective target object in a test area. The sound reflective target object itself can generate sound waves that project from the sound reflective target object and could be detected by passive sonar, or sound waves can reflect off the surface of the sound reflective target object (i.e., sonar return sound waves) and could be detected by an active sonar receiver. While the surface area of a sound reflective object is typically much larger than the surface area of the sound receiver, the energy level of the sound wave that reflects off of the surface of a sound reflective object is usually much smaller than the energy level of the sound wave originally transmitted by the sound source. Where the energy level of the reflected sound wave is greater than the ambient noise level at the sound receiver location, the reflected sound wave will provide the sound receiver an opportunity to detect the sound reflective object.

In one embodiment of the present invention, a two-step process is used to determine whether a sound source, such as active sonar, will have an opportunity to detect a sound reflective target object of known location. First, ray traces for sound waves transmitted by the sound source are calculated and plotted to determine whether there is an existing path for the sound waves to follow to the location of a sound reflective target object. As shown in FIG. 8, the sound waves propagating from a sound source at a depth of 200 feet have an existing path to impinge upon a target at a range of 8000 yards and a depth of 300 feet. Where a sound path exists for the sound source transmitted sound waves to propagate to the known location of a sound reflective target object, the present invention then calculates and plots ray traces from the position of the sound reflective target object to the location of the sound receiver to determine whether there is an existing path for sound waves reflecting off of the surface of the sound reflective target object to return from the location of sound reflective target object to the location of the sound receiver. As shown in FIG. 9, the sound waves reflecting off of a target at a depth of 300 feet have an existing path to return to the sound receiver located at a range of 8000 yards and a depth of 200 feet.

Snell's law is also valid for sound waves propagating from a deeper and cooler area to a shallower and warmer area; the symmetry of Snell's law shows that the same ray paths are applicable in opposite direction, with one exception. As previously discussed, when a sound wave is moving from a shallower and warmer area to a deeper and cooler area, the propagation speed of the sound changes. However, The above equation for Snell's law has only an imaginary solution when the incident angle of the sound wave, $\Theta_1$, is greater than the critical angle (i.e., $\Theta_1 > \Theta_{CRIT}$). The critical angle is calculated by taking the inverse sine (arcsin) of the ratio of the speed of sound at the sound source depth (i.e., the initial transmission point) and the speed of sound at the layer. The equation for the critical angle is:

$$\Theta_{CRIT} = \text{Arcsin}\left(\frac{c_1}{c_2}\right)$$

Where:
$c_1$=the speed of sound at the sound source depth.
$c_2$=the speed of sound at the layer.

For the above equation to calculate a valid critical angle, the ratio of $c_1/c_2$ must be a value less than 1.0. For example, the critical angle for sound waves propagating from a sound source at a depth of 200 feet encountering the sonic layer (the sonic layer is the depth at which the speed of sound in the water begins to steadily decrease as the depth increases) at a depth of 569.8 feet, as shown in FIG. 1, can be determined by the following method. First, using the numeric SVP data for each layer from FIG. 1, the speed of sound at 200 feet is determined to be 5030.98 feet per second and the speed of sound at the sonic layer is determined to be 5037.39 feet per second. Inserting these values into the above equation results in:

$$\Theta_{CRIT} = \text{Arcsin}\left(\frac{c_1}{c_2}\right) = \text{Arcsin}(5030.98/5037.39) = 87.12°$$

(relative to the normal perpendicular to the horizontal plane established by the sound speed boundary).

In this example, the critical angle for sound waves propagating from a sound source at a depth of 200 feet is 87.12°.

However, since the ray angle is referenced to the horizontal plane and the critical angle, $\Theta_{CRIT}$, is referenced to the normal perpendicular to the horizontal plane, the reference plane for one of these values must be changed to provide a common reference coordinate. As shown below, to reference the critical angle, $\Theta_{CRIT}$, to the horizontal plane, the calculated critical angle value is subtracted from 90°.

$$90° - 87.12° = 2.88°$$

Where the ray incident angle, $\Theta_1$, referenced to the horizontal plane, is less than 2.88°, the sound ray will not pass through the layer. Based on the example calculations for the sonic layer, sound rays striking the sonic layer at an angle equal to or less than to 2.88° below the horizontal plane will be completely reflected and trapped in the surface duct. As shown in FIG. 9, the sound rays at 1° and 2° below the horizontal plane are reflected and trapped in the surface duct, while the sound rays at angles greater than 2.88° pass through the sonic layer. The present invention will also calculate the critical angle and plot the ray traces for sound waves propagating from a lower sound speed area to a higher sound speed area to determine the sound rays that refract through the layer.

After a test has been completed, SVP data collected during the test by the system under test, a dipping sonar or a bathythermographic sonobuoy, can be input into the present invention to verify that the acoustic conditions encountered were as expected based on the ray trace output of the present invention. Where there is a significant variance between the SVP data input and SVP data collected by the system under test, the system and method of the present invention can quickly calculate updated ray trace plots for the acoustic conditions encountered by the sound source under test to determine if the variance in acoustic conditions affected the validity of any of the tests conducted.

It is also widely recognized that sound waves emitted from a sound source rarely arrive at a receiving or monitoring location by only a single direct path. In many cases, sound waves arrive by more than one path (i.e., multipaths) spaced over a defined interval of time with varying angles of arrival. For underwater test environments, the most common sound wave multipaths are reflections off of the test area ocean surface and/or the test area ocean floor. It is assumed that the topography of the ocean floor of a test range or area is well known. To account for sound wave multipaths, the system and method of the present invention enables the user to specify a desired number of reflections off of the body of water surface and/or floor/bottom of the test range or area. A target may be detected by a sound wave reflecting off of the surface of water, as shown in FIG. 9. This feature is especially useful for understanding situations where sonar detection was made where the detection was not expected. By varying the number of reflections, the test team may discover unexpected sound wave paths from the sound ray trace data plots.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method of modeling sound propagation in a body of water, comprising the steps of:
   obtaining SVP data for the body of water;
   determining a depth of a sound source within the body of water;
   selecting a first ray angle originating from the sound source;
   calculating a first ray trace for the first ray angle using only the SVP data as environmental inputs;
   repeating the selecting and calculating steps for second-$n^{th}$ ray angles to calculate second-$n^{th}$ ray traces for the second-$n^{th}$ ray angles; and
   plotting the first-$n^{th}$ ray traces to create a ray trace plot for the body of water relative to the depth of the sound source.

2. The method of claim 1, wherein the obtaining step comprises using historical SVP data for the body of water.

3. The method of claim 1, wherein the obtaining step comprises measuring actual SVP data for the body of water within 24 hours of initiating the method.

4. The method of claim 1, wherein the sound source emits sound waves generated by the sound source.

5. The method of claim 4, wherein the sound source is an active sonar device positioned at a known location and depth within the body of water.

6. The method of claim 1, wherein the sound source reflects sound waves generated by another source.

7. The method of claim 1, wherein the first-$n^{th}$ ray angles are selected from a predetermined range of ray angles, and are at equally spaced intervals within the range.

8. The method of claim 1, wherein the calculating step further comprises:
   selecting depth/sound speed pairs from the SVP data; and
   calculating horizontal range from the sound source for each depth/sound speed pair.

9. The method of claim 1, further comprising the steps of:
   determining additional depths of the sound source within the body of water; and
   repeating the selecting and calculating steps to create a ray trace plot for the body of water relative to each additional depth of the sound source.

10. The method of claim 1, wherein the sound source is an object of unknown location, the determining step assumes a plurality of different depths for the sound source, and the selecting and calculating steps are repeated to create a plurality of ray trace plots for the body of water relative to the plurality of different depths.

11. A method of confirming operability of a sonar receiver in an underwater testing environment, comprising the steps of:
   obtaining SVP data for the underwater testing environment;
   determining a depth of a sound source within the underwater testing environment;
   selecting a first ray angle originating from the sound source;
   calculating a first ray trace for the first ray angle using only the SVP data as environmental inputs;
   repeating the selecting and calculating steps for second-$n^{th}$ ray angles to calculate second-$n^{th}$ ray traces for the second-$n^{th}$ ray angles;
   plotting the first-$n^{th}$ ray traces to create a ray trace plot for the underwater testing environment relative to the depth of the sound source; and
   deploying underwater sound transmitting and receiving equipment at a location in the underwater testing environment that intersects at least one ray trace on the ray trace plot for the sound source; and confirming that the underwater sound transmitting and receiving equipment detects the sound source.

12. A system for confirming the operability of an underwater sound receiver in an underwater testing environment, the system comprising:
   means for obtaining SVP data for the underwater testing environment;
   means for determining a depth of a sound source within the underwater testing environment;
   means for selecting first-$n^{th}$ ray angles originating from the sound source;
   means for calculating first-$n^{th}$ ray traces for the first-$n^{th}$ ray angles using only the SVP data;
   means for plotting the first-$n^{th}$ ray traces to create a ray trace plot for the underwater testing environment relative to the depth of the sound source; and
   means for deploying the sonar receiver at a location in the underwater testing environment that intersects at least one ray trace on the ray trace plot for the sound source;

and confirming that the sound transmitting and receiving equipment detects the sound source.

13. A computer-readable medium having stored thereon computer executable instructions for implementing a method of modeling sound propagation in a body of water according to the steps of claim 1.

14. A computer-readable medium having stored thereon computer executable instructions for confirming operability of a sonar receiver in an underwater testing environment according to the steps of claim 11.

* * * * *